United States Patent [19]
Taylor

[11] Patent Number: 5,983,729
[45] Date of Patent: Nov. 16, 1999

[54] SLENDER COLUMN FORCE TRANSDUCER

[76] Inventor: Julian S. Taylor, 8300 SW. 8th St., Oklahoma City, Okla. 73128

[21] Appl. No.: 09/105,102

[22] Filed: Jun. 25, 1998

[51] Int. Cl.$^6$ .............................. G01N 3/20; G01M 5/00
[52] U.S. Cl. ....................................... 73/849; 73/862.474
[58] Field of Search .............................. 73/812, 849, 852, 73/854, 862.26, 862.393, 862.474; 137/68.18

[56] References Cited

U.S. PATENT DOCUMENTS

| | | | |
|---|---|---|---|
| 3,378,648 | 4/1968 | Fenner . | |
| 4,454,770 | 6/1984 | Kistler | 73/862.633 |
| 4,641,538 | 2/1987 | Heyraud | 73/862.26 |
| 4,716,614 | 1/1988 | Jones et al. | 15/105 |
| 4,939,938 | 7/1990 | Soderholm | 73/862.471 |
| 5,146,942 | 9/1992 | Taylor | 137/67 |
| 5,297,575 | 3/1994 | Taylor | 137/70 |

*Primary Examiner*—Max Noori

[57] ABSTRACT

A force transducer is formed by utilizing a slender column, having co-extensive opposing flat surfaces, interposed between a fixed member and a member movable toward the fixed member so that the plane of bending will be perpendicular to the flat surfaces. A pair of strain gauges are attached to the opposite flat sides of the column and connected with opposing terminals of a Wheatstone bridge in series through the respective strain gauge and balanced by resistors. The read-out of the bridge indicates the increase or decrease in resistance of the strain gauges which is proportional to the force applied.

6 Claims, 2 Drawing Sheets

SLENDER COLUMN FORCE TRANSDUCER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to pressure transducers and more particularly a transducer utilizing strain gauges on diametric opposite sides of a slender column or collapsible pin to measure force by the bending of the slender column collapsible pin prior to a critical force at which the slender column would collapse. Rupture pin pressure relief valves are generally well known. A collapsible or buckling pin is formed by a slender column which yields or collapses by force applied to the axis of the slender column. The yield point at which the column collapses can be easily calibrated in accordance with Euler's formula for slender columns.

Transducers for indicating the value of a force or pressure are well known. Such transducers generally include a diaphragm and strain gauges on the diaphragm indicates the pressure value by diaphragm fluctuation. Instruments recording such fluctuations must be periodically adjusted to achieve accuracy in measurement. As stated hereinabove this invention uses strain gauges on opposite sides of a slender column with the force to be measured axially impressed on the slender column.

This invention is an improvement over known force transducers by using a collapsible pin having opposing parallel sides so that the direction of bending of the collapsible pin under axial pressure below its yield value will be known by bending laterally in either its flat surfaces direction. Since the direction of bending is known, the amount of bending can be measured.

2. Description of the Prior Art

U.S. Pat. No. 5,146,942 issued Sep. 15, 1992 to Taylor for Low Pressure Fluid Emergency Shutdown Valve and U.S. Pat. No. 5,297,575 issued Mar. 29, 1994 for In-Line High Pressure Fluid Release Valve are believed good examples of the state-of-the-art. Each of these patents disclose a long slender column forming a pressure collapsible pin having one end portion secured in a socket of a valve body and the opposite end portion of the pin secured in a coaxial socket moved toward the axis of the collapsible pin by fluid pressure in a vessel or line being monitored. The collapsible pin being responsive to the axially imposed force caused by fluid pressure will swing laterally and buckle in response to fluid pressure greater the yield value of the slender pin. The direction of bending is not known since it is free to bend in any direction.

BRIEF SUMMARY OF THE INVENTION

This transducer utilizes a slender column axially opposing a force which bends the column in response to force below a critical pressure or force at which the column would buckle. Opposite sides of the column are provided with a co-extensive flat surface. One end of the column abuts a fixed surface and the opposite end of the pin abuts and opposes a force or pressure to be measured. Respective end portions of the column are snugly received in cooperating sockets. The parallel flat surfaces insure that the plane of bending is perpendicular to the flat surfaces. A pair of strain gauges are attached to the opposite flat sides of the column and are connected with a Wheatstone bridge. When the column bends in one direction one strain gauge is under tension and increases its resistance while the other strain gauge is compressed and decreases its resistance. The increase or decrease in resistance of the strain gauges is proportional to the force applied. The column is constructed from material having a constant modulus of elasticity over the ambient temperature used. Therefore no temperature correction or recalibration is required. The voltage output of the bridge is recorded by any suitable instrument, such as a digital volt meter.

The principal object of this invention is to provide a transducer which records force bending a slender column as opposed to a diaphragm and eliminates the requirement of periodic recalibration to remain accurate in force measurement.

DETAILED DESCRIPTION OF THE INVENTION

Figure 2:
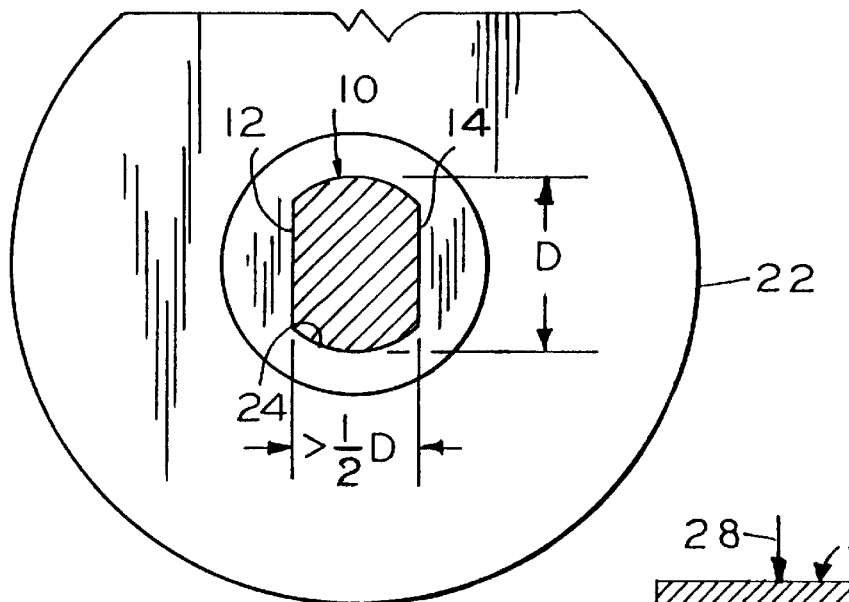
FIG. 2 is a fragmentary transverse cross sectional view looking in the direction of the arrows 2—2 of FIG. 1.
Figure 3:
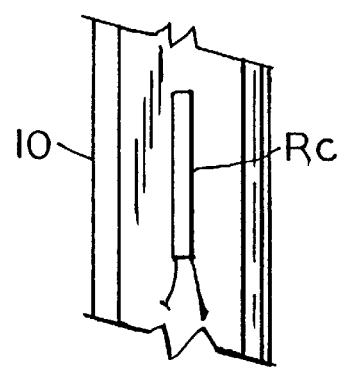
FIG. 3 is a fragmentary elevational view of looking the direction of the arrows 3—3 of FIG. 1.
Figure 1:
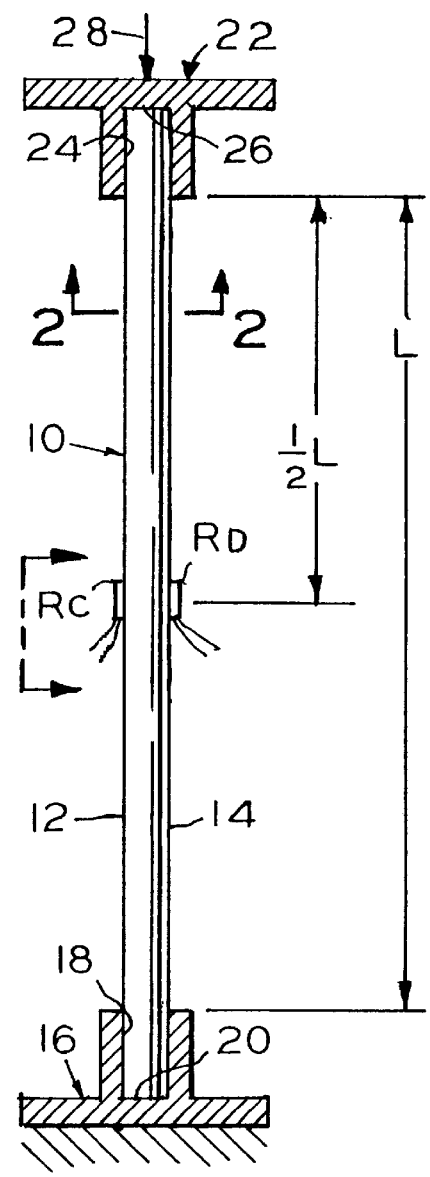
FIG. 1 is a side elevational view of a slender column, partly in section.
Figure 5:
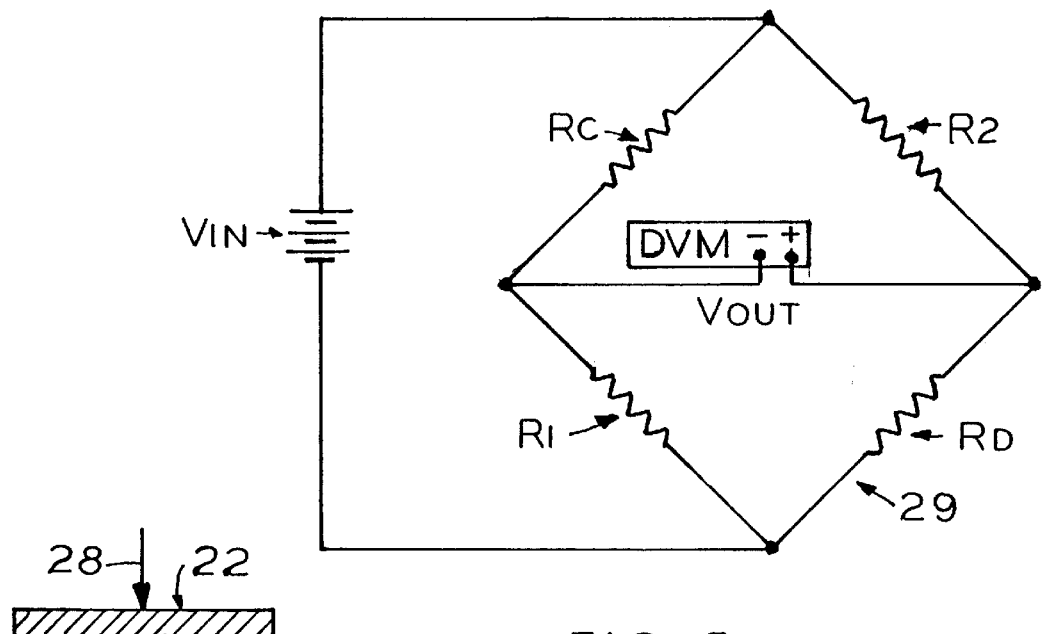

Like characters of reference designate like parts in those figures of the drawings in which they occur.

In the drawings:

The reference numeral 10 indicates a right-circular cylindrical slender column in which the diameter D and length L may be varied depending upon the anticipated force or pressure to be measured. The predetermined pressure or force value of the column is selected in accordance with Euler's formula for slender columns. The force value to be monitored or measured cannot be more than the critical load factor which would collapse the slender column 10 prior to reaching this critical force value. The slender column under a rising and decreasing force value bends slightly and then straightens as the force is reduced. In order to determine the direction of bending, the column 10 is provided with opposite coextensive flat surfaces 12 and 14 with the dimension between the flat surfaces 12 and 14 being >½D.

Figure 4:
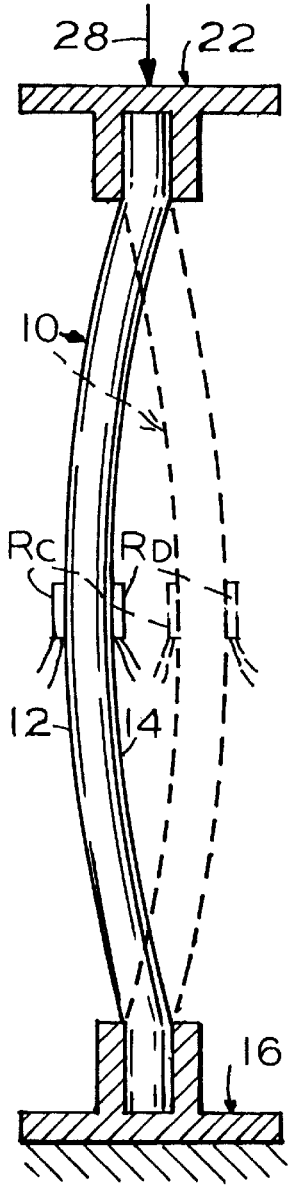
FIG. 4 is a view similar to FIG. 1 illustrating the lateral bending of the slender column by solid and dotted lines; and, FIG. 5 is a diagram of a strain gauge measuring bridge.

A first stationary body 16 having a socket 18 terminating in a flat bottom 20 snugly surrounds one end portion of the column 10. A second body 22 axially moveable toward and away from the first body 16 is similarly provided with a coaxial socket 24 having a flat bottom 26 which snugly surrounds and abuts the end surface of the end portion of the column 10 opposite the first body 16. The first and second strain gauges RC and RD are respectively bonded to the opposite flat surfaces 12 and 14 medially their ends. Strain gauges RC and RD are respectively interposed in the strain gauge bridge, such as a Wheatstone bridge, between resistors R1 and R2 of known value. A known source of energy, such as a battery, indicated at VIN applies current to opposite terminals of the bridge and the remaining opposite terminals of the bridge produce a voltage out VOUT reading to an instrument such as a digital voltage meter DVM which records the value of a force or pressure applied to the moveable body 22 in the direction of the arrow 28. The plane of the bending of the column 10 is known, either the direction of the flat surface 12 or 14. Oppositely disposed strain gauges RC and RD are bonded to the respective flat surfaces substantially medially their ends. When a pressure or force, indicated by the arrow 28, the column 10 bends as indicated by solid lines (FIG. 4). This bending results in the strain gauge RC revealing a tensile or tension value for the flat surface 12 while the opposite strain gauge RD reveals a compression value for the flat side 14 of the column. Conversely if the column 10 bends in the direction of the dotted lines (FIG. 4) the strain gauge RC will reveal a compression value while the strain gauge RD reveals a tensile or tension value of the applied force 28.

Thus the direction of bending is immaterial since one strain gauge is in compression and the opposite strain gauge is in tension so that as one strain gauge decreases its resistance the other strain gauge increases its resistance. The increase or decrease in resistance is proportional to the force or pressure 28.

Strain gauges and strain gauge bridge amplifier modules may be obtained from Omega Engineering, Inc., P.O. Box 4047, Stanford, Conn. 06907-0047 and are listed in the Omega Company Pressure Strain and Force Handbook, Volume No. 29, 1995.

Obviously the invention is susceptible to changes or alterations without defeating its practicability. Therefore, I do not wish to be confined to the preferred embodiment shown in the drawing and described herein.

I claim:

1. A slender column force transducer, comprising;

a first stationary body;

a second body axially moveable toward and away from said first body, said first body and said second body each having a flat bottom socket coaxially aligned with the socket in the opposite body;

a right-circular cylindrical slender column of a uniform given diameter and yield value and having opposite equally spaced apart coextensive flat surfaces formed from a material having a constant modulus of elasticity over a given temperature range and having respective end portions snugly nested by the body sockets;

strain gauge means bonded to the respective flat surfaces medially its ends for respectively indicating the tension and compression of the strain gauge means by the lateral bending of the slender column in either direction of the flats in response to a force axially applied to said moveable body opposite the column; and, strain gauge bridge means connected with said strain gauge means for indicating the value of the applied force.

2. The transducer according to claim 1 in which the slenderness ratio is greater than 30.

3. The transducer according to claim 2 in which the dimension between said flat surfaces is greater than one-half the diameter.

4. A slender column force transducer, comprising;

a first stationary body;

a second body axially moveable toward and away from said first body, said first body and said second body each having a flat bottom socket coaxially aligned with the socket in the opposite body;

a right-circular cylindrical slender column of a uniform diameter and having opposite equally spaced apart coextensive flat surfaces formed from a material having a constant modulus of elasticity over a given temperature range and having respective end portions snugly nested by the body sockets;

strain gauge means bonded to the respective flat surface intermediate its ends for respectively indicating the tension and compression of the strain gauge means by the lateral bending of the slender column in either direction of the flats in response to a force axially applied to said moveable body opposite the column; and, strain gauge bridge means connected with said strain gauge means for indicating the value of the applied force.

5. The transducer according to claim 4 in which the slenderness ratio is greater than 30.

6. The transducer according to claim 5 in which the dimension between said flat surfaces is greater than one-half the diameter.

* * * * *